| United States Patent [19]
Bourguignon et al.

[11] Patent Number: 5,081,180
[45] Date of Patent: Jan. 14, 1992

[54] GRAFT PRESTABILIZING AND STABILIZING COPOLYMERS AND THEIR PREPARATION, PROCESS FOR OBTAINING DISPERSIONS OF POLYMERS/POLYOLS AND PROCESS FOR OBTAINING POLYURETHANE FOAMS

[76] Inventors: Marc Bourguignon, Rue Ulysse Ars 2, 7990 Sirault; Etienne Goethals, Chemin de la Maison du Roi 16, 1338 Lasne; Jean-Paul Masy, Rue du Tombay 82, 4030 Liege; Robert Jerome, Rue des Sorbiers 6, 4040 Tilff; Philippe Teyssie, Bois du Rognac 85, 4121 Neuville-En-Condroz, all of Belgium

[21] Appl. No.: 438,612

[22] Filed: Nov. 17, 1989

[30] Foreign Application Priority Data
Nov. 17, 1988 [BE]  Belgium ............................. 08801308

[51] Int. Cl.⁵ ............................................. C08F 283/06
[52] U.S. Cl. .................................... 524/762; 521/137
[58] Field of Search ...................... 524/762; 521/137

[56] References Cited
U.S. PATENT DOCUMENTS

| | | | |
|---|---|---|---|
| 3,823,201 | 7/1974 | Pizzini et al. | 260/861 |
| 4,148,840 | 4/1979 | Shah | 260/859 R |
| 4,454,255 | 6/1984 | Ramlow et al. | 521/137 |
| 4,458,038 | 7/1984 | Ramlow et al. | 521/137 |
| 4,591,607 | 5/1986 | Campbell et al. | 524/762 |

FOREIGN PATENT DOCUMENTS
EP262653 9/1986 European Pat. Off. .

*Primary Examiner*—Maurice J. Welsh
*Assistant Examiner*—Rachel Johnson
*Attorney, Agent, or Firm*—Woods, Phillips, Mason, Recktenwald & VanSanten

[57] ABSTRACT

Prestabilizing copolymers comprising the product of the in situ reaction of a mixture of ethylenically unsatured monomers containing at least one mono-unsaturated monomer containing no groups which can be alkoxylated and one unsaturated monomer containing a group which can be alkoxylated, a prepolyol of low molecular weight and a polymerization catalyst as well as an alkoxylating agent for the abovementioned reaction product chosen from the group comprising ethylene oxide, propylene oxide and their mixtures, process for obtaining dispersions of polymers/polyols and process for obtaining polyurethane foams.

40 Claims, No Drawings

GRAFT PRESTABILIZING AND STABILIZING COPOLYMERS AND THEIR PREPARATION, PROCESS FOR OBTAINING DISPERSIONS OF POLYMERS/POLYOLS AND PROCESS FOR OBTAINING POLYURETHANE FOAMS

The present invention relates to "single comb-shaped" graft prestabilizing copolymers and "double comb-shaped" graft stabilizing copolymers, to their preparation process, to a process for obtaining dispersions of polymers/polyols from these "double comb-shaped" copolymers and to the dispersions thus obtained, as well as to a process for obtaining polyurethane foams from these dispersions and to the foams thus obtained.

The polyurethanes comprise a category of plastic materials which find very diverse application, in particular in the form of flexible or rigid foams, elastomers, varnishes, etc. They are produced by reacting diisocyanates or polyisocyanates with compounds containing active hydrogen atoms, in general polyhydroxy compounds or polyols of the polyether or polyester type containing hydroxyl groups.

The physical and chemical characteristics of polyurethanes depend on the choice of reactants and on the reaction conditions. In the particular case of flexible polyurethane foams, it is sought to obtain high firmness and high elasticity characteristics at the same time, that is to say to offer the "lift" and the comfort which the user demands. The lift properties of flexible polyurethane foams can be improved by using in their preparation, as polyhydroxy compounds, dispersions of polymers/polyols obtained by in situ polymerization of one or more unsaturated monomers in a polyol. The in situ polymerization of unsaturated monomers in the polyol is effected in the presence of a free radical catalyst and leads to the formation of a mixture of polymers in the polyol in which part of the polymer is chemically bonded to the polyol by grafting.

The preparation of these polymers/polyols and their use in the production of polyurethanes has been the subject of numerous patents and various products have been marketed. In particular, polymers/polyols prepared by in situ copolymerization of mixtures of acrylonitrile and styrene in a polyol have been developed. In fact, acrylonitrile has a pronounced capability for grafting, while styrene has a good reactivity towards acrylonitrile and has a good efficiency with regard to the improvement of the lift properties of foams. The preparation of polymers/polyols of this type is described, for example, in Belgian Patents No. 788,115 and 818,680 of Union Carbide Corporation.

Obtaining stable dispersions of polymers/polyols based on unsaturated monomers, such as acrylonitrile and styrene, presents certain difficulties. It is well known that acrylonitrile, although it contributes to the stability of the dispersions because of its pronounced tendency for grafting, nevertheless has the drawback, when it is used in a large amount, of being responsible for yellowing of polyurethane foams. This yellowing can be eliminated by reducing the amount of acrylonitrile relative to styrene. However, the stability of the dispersions decreases when the proportion of styrene is increased relative to acrylonitrile and it is not possible to obtain dispersions of good stability using large quantities of styrene.

Various solutions have been proposed for resolving this problem of the stability of dispersions of polymers/polyols while eliminating the phenomenon of yellowing of polyurethane foams, in particular:
in situ copolymerization in a polyol unsaturated at the end of chains or "macromonomer";
in situ copolymerization in a polyol in the presence of a small amount of a preformed graft polyol.

The first of these processes is described in U.S. Pat. Nos. 3,823,201, 4,454,255 and 4,458,038 (BASF WYANDOTTE). The unsaturated polyol (or"macromonomer") used in this process is a reaction product of a polyether polyol with maleic acid, maleic anhydride and fumaric acid. In the course of the in situ copolymerization of acrylonitrile and styrene in this polyol, copolymerization reactions result between these monomers and the unsaturated groups of the polyol, which improves the stability of the dispersions.

The second process is the subject, in particular, of U.S. Pat. No. 4,148,840 (Union Carbide). This patent claims the preparation of polymers/ polyols by in situ polymerization of one or more unsaturated monomers in a polyol, preferably of low molecular weight, in the presence of a small amount of a preformed polymer/polyol. The preformed polymer/polyol, the viscosity of which does not exceed 40,000 mPa.s at 25° C., is obtained by in situ polymerization of one or more unsaturated monomers in a second polyol, preferably of high molecular weight. This process enables stable dispersions of high polymer contents to be obtained while providing the possibility of increasing the styrene/ acrylonitrile ratio, which reduces the phenomenon of the yellowing of foams.

However, these processes have the drawback of not using extremely specific stabilizers, that is to say stabilizers tailored to the polyols to be reinforced.

This is why, according to the present invention, it is possible to prepare stable dispersions of polymers/polyols forming, as stabilizers in their preparation, certain specific "double comb-shaped" graft copolymers from precursor copolymers containing, in random distribution, xyalkyl groups and groups promoting free radical grafting.

One of the aims of the present invention is consequently to overcome the abovementioned drawbacks by the preparation of specific "double comb-shaped" graft stabilizing copolymers as well as their use in the preparation of stable dispersions of polymers/polyols intended for the production of polyurethanes. The specificity is obtained by the formation of a "single comb-shaped" prestabilizing copolymer in the course of the synthesis of the polyol itself; the "double comb-shaped" stabilizer results from the grafting of this "single comb-shaped" copolymer during the preparation of the dispersion.

To this end, according to the present invention "single comb-shaped" graft prestabilizing copolymers are provided which comprise the product of the in situ reaction of a mixture of ethylenically unsaturated monomers containing at least one mono-unsaturated monomer containing no groups which can be alkoxylated and one unsaturated monomer containing a group which can be alkoxylated, a prepolyol of low molecular weight and a polymerization catalyst as well as an alkoxylating agent for the abovementioned reaction product chosen from the group comprising ethylene oxide, propylene oxide and their mixtures.

Advantageously, the mixture of monomers contains at least one monomer promoting free radical grafting.

According to an advantageous embodiment of the invention, the proportion by weight of the mixture of monomers is of the order of 1% to 75% and preferably of the order of 20% to 60% relative to the prepolyol.

According to a particularly advantageous embodiment of the invention, the mixture of ethylenically unsaturated monomers contains about 1 to 20 moles of unsaturated monomer containing a group which can be alkoxylated and 1 to 25 moles of monomer promoting free radical grafting per 100 moles of mono-unsaturated monomer which does not contain groups which can be alkoxylated.

The invention also relates to a process for the preparation of these "single comb-shaped" graft prestabilizing copolymers.

This process is characterized in that it comprises the in situ copolymerization of the mixture of ethylenically unsaturated monomers in the prepolyol of low molecular weight in the presence of the polymerization catalyst in such a way as to form an unsaturated precursor copolymer, containing a group which can be alkoxylated, in solution in the prepolyol, the alkoxylation of the said precursor copolymer and of the prepolyol in the presence of a basic catalyst in such a way as to obtain a reaction mixture constituted by a "single comb-shaped" graft copolymer in solution in a polyol and the neutralization of the reaction mixture by an acid, enabling the basic catalyst to be converted to a neutral salt.

The invention also relates to stable dispersions of polymers/polyols and to their preparation process.

These stable dispersions of polymer/polyol comprise the product of the in situ reaction of at least one ethylenically unsaturated monomer in the polyol, a "single comb-shaped" graft prestabilizing copolymer as defined and/or prepared above and a polymerization initiator.

Their preparation process is itself characterized in that it comprises the in situ polymerization of at least one ethylenically unsaturated monomer in the polyol in the presence of the "single comb-shaped" prestabilizing graft copolymer, in the presence of the polymerization initiator and, if appropriate, of a supplementary amount of polyol, the unsaturated monomer being polymerized, under the effect of the initiator, into particles which are insoluble and partially grafted on the "single comb-shaped" prestabilizing copolymer in the polyol and producing a "double comb-shaped" graft copolymer ensuring the stabilization of the dispersion thus obtained.

According to an advantageous embodiment of the invention, about 1% to about 45% and preferably about 5% to about 30% by weight of "single comb-shaped" prestabilizing graft copolymer are used relative to the total weight of unsaturated monomer and of polyol.

The present invention also relates to these stable dispersions of polymers/polyols and to the preparation of polyurethane foams prepared from these dispersions of polymers/polyols, water, catalysts, surfactants and polyisocyanate. The invention also relates to the polyurethane foams thus obtained.

Further details and features of the invention will be evident from the description given below by way of a non-limiting example of several particular embodiments of the invention.

As has already been indicated above, the "single comb-shaped" prestabilizing graft copolymers of the present invention are obtained by the in situ reaction or copolymerization in a prepolyol of low molecular weight of a mixture of ethylenically unsaturated monomers containing at least one mono-unsaturated monomer which does not contain groups which can be alkoxylated and one unsaturated monomer possessing one or more groups which can be alkoxylated, as well as, if appropriate, a monomer promoting free radical grafting, this step being followed by an alkoxylation of the reaction mixture by means of ethylene oxide, propylene oxide or a mixture of these compounds.

The in situ copolymerization of these unsaturated monomers in the prepolyol of low molecular weight, which is carried out in the presence of a conventional initiator for this type of reaction, such as free radical initiators, leads to the formation of a precursor copolymer containing the unsaturation and groups which can be alkoxylated in solution in the polyol. By alkoxylation in the presence of a basic catalyst, the groups which can be alkoxylated in the copolymer are etherified with the formation of the "single comb-shaped" prestabilizing graft copolymer, while a polyol of higher molecular weight, such as is required by the subsequent applications, is formed from the prepolyol.

When they are used in the preparations of dispersions of polymers/polyols, the "single comb-shaped" graft copolymers thus obtained in the polyols exhibit a stabilizing effect resulting from the presence in their chains of ethylenic unsaturations which participate in the grafting reactions with the formation of "double comb-shaped" graft stabilizing copolymer. Moreover, these "single comb-shaped" graft copolymers are in solution in polyols for which the molecular weight, determined by the weight, can advantageously be determined such that it corresponds to that of polyethers currently used in the production of polyurethanes.

According to the present invention the "single comb-shaped" graft prestabilizing copolymers are obtained by copolymerization of unsaturated monomers in a prepolyol which has a molecular weight of less than 5,000 and preferably of between 500 and 2,000. In this respect it is possible to use any prepolyol which is able to keep the precursor copolymer in solution, in particular glycols, triols and polyether-polyols, such as polyethylene glycols and condensation products of ethylene oxide and/or ethylene oxide and/or propylene oxide with initiators containing hydroxyl groups, such as glycerol, trimethylolpropane or other polyols. The amount of the mixture of unsaturated monomers used in the copolymerization reaction in the absence or in the presence of the monomer with two ethylenic unsaturations is of the order of 1% to 75% and preferably of 20% to 60% relative to the weight of the prepolyol.

The mixture of ethylenically unsaturated monomers contains preferably 1 to 20 moles of unsaturated monomer containing a group which can be alkoxylated and preferably 1 to 25 moles of monomer promoting free radical grafting, if such is used, per 100 moles of mono-unsaturated monomer which does not contain groups which can be alkoxylated.

Mono-unsaturated monomers which do not contain groups which can be alkoxylated which can advantageously be used are styrene or styrene derivatives, such as α-methylstyrene, methylstyrene, 2,4-dimethylstyrene, ethylstyrene, isopropylstyrene, butylstyrene, phenylstyrene, cyclohexylstyrene, benzylstyrene, chlorostyrene, 2,5-dichlorostyrene, bromostyrene, cyanostyrene, nitrostyrene, N,N,-dimethylaminostyrene, acetoxystyrene, methyl 4-vinylbenzoate or phenoxystyrene, acrylic monomers, such as acrylonitrile, methacrylonitrile, methyl acrylate, methyl methacrylate, cyclohexyl acrylate, cyclohexyl methacrylate, benzyl acrylate, benzyl methacrylate, isopropyl acrylate, isopropyl methacrylate, octyl acrylate, octyl methacrylate, methyl α-chloroacrylate, ethyl α-ethoxyacrylate, butyl acrylate, butyl methacrylate, 2-ethylhexyl acrylate, 2-ethylhexyl methacrylate, phenyl acrylate, phenyl methacrylate, α-chloroacrylonitrile, N,N-dimethylacrylamide or N,N-dibenzylacrylamide, vinyl halides, such as vinylidene chloride, vinyl bromide, vinyl chloride, vinyl fluoride or vinylidene fluoride, or vinyl ethers or vinyl esters, such as vinyl acetate, vinyl chloroacetate, isopropenyl acetate, vinyl formate, vinyl methoxyacetate, vinyl benzoate, methyl vinyl ether, ethyl vinyl ether, propyl vinyl ether, butyl vinyl ether, phenyl vinyl ether, methyl vinyl ketone, vinylpyridine, ethyl vinyl ketone, phenyl vinyl ketone, N-vinylpyrrolidone, dimethyl fumarate or dimethyl maleate. Two or more of these substances can also be used in the mixture of ethylenically unsaturated monomers.

The unsaturated monomers containing a group which can be alkoxylated which can be used within the framework of the present invention are monomers which simultaneously possess an ethylenically unsaturated group and at least one group which can be alkoxylated, that is to say a group capable of reacting with ethylene oxide, propylene oxide or the polyol in the course of the alkoxylation step, forming groups oxyalkylated or polyoxyalkylated to the structure of polyethers. These groups which can be alkoxylated can be groups containing active hydrogen atoms, such as hydroxyl, amine, amide or carboxyl groups. They can also comprise anhydride or epoxide groups capable of reacting with ethylene oxide or propylene oxide under the conditions of the alkoxylation.

Depending on whether monomers containing hydroxyl, anhydride or epoxide groups are used, the polyether grafts are of a different size and structure, the use of monomers provided with a hydroxyl group giving rise to linear grafts shorter than the polyol. Their average molecular weight can be adjusted as a function of the molecular weight of the prepolyol and of that of the final polyol:

$$Mn \text{ grafts} = \frac{Mn \text{ polyol} - Mn \text{ prepolyol}}{n}$$

(n = number of functional groups in the polyol).

The monomers which contain an anhydride group lead to branched grafts which have a molecular weight of:

$$Mn = \frac{Mn \text{ prepolyol} + (n - 1) Mn \text{ polyol}}{n}$$

while those which contain an epoxide function yield branched grafts of the same molecular weight as the final polyol. The number of grafts is determined by the proportion of these monomers containing a group which can be alkoxylated.

These unsaturated monomers containing a group which can be alkoxylated include unsaturated alcohols or polyols, such as allyl alcohol, 2-butene-1,4-diol, 3-butene-1,2-diol, glycerol monoallyl ether or trimethylolpropane monoallyl ether, esters of unsaturated carboxylic acids with glycols or polyols, such as hydroxyethyl acrylate, hydroxyethyl methacrylate, hydroxypropyl acrylate, hydroxypropyl methacrylate, glycerol monoacrylate and glycerol monomethacrylate, esters of unsaturated carboxylic acids with alcohols containing amine groups, such as monoethanolamine, diethanolamine and triethanolamine, unsaturated carboxylic acids or anhydrides of unsaturated carboxylic acids, such as acrylic acid, methacrylic acid, fumaric acid, itaconic acid, crotonic acid and maleic anhydride, unsaturated amides, such as acrylamide, methacrylamide and N-butylacrylamide, unsaturated epoxides, glycidyl acrylate, glycidyl methacrylate, allyl glycidyl ether, butadiene monoepoxide and vinylcyclohexane-3,4-epoxide. As in the case of the unsaturated monomers, two or more of these substances can also be used.

Examples which may be mentioned of monomers promoting the free radical grafting which can be used in the preparation of the stabilizing graft copolymers of the present invention are butadiene, isoprene, 1,4-pentadiene, piperylene, 1,4-hexadiene, 1,7-octadiene, allyl acrylate, allyl methacrylate, ethylene glycol dimethacrylate, diethylene glycol dimethacrylate, 1,4-butanediol dimethacrylate, divinylbenzene, divinyl ether, divinyl sulphide, divinyl sulphone and monomers with a high transfer constant, such as N,N-diethylaminoethyl acrylate, vinyl laurate, vinyl isobutyrate, vinyl dodecanate, vinyl hexanoate, the bromstyrenes, the α- and β-bromostyrenes, vinylnaphthalene and vinylanthracene. As in the preceding cases, mixtures of two or more of these substances can be used.

The copolymerization of these ethylenically unsaturated monomers in the prepolyol of low molecular weight is carried out at a temperature of about 25° C. to 180° C., preferably of 70° C. to 150° C., in the presence of a polymerization catalyst. Polymerization catalysts which can be used are free radical catalysts, such as peroxides, persulphates, perborates, azo compounds etc., which are well known catalysts for vinyl polymerizations. Examples of catalysts which may be mentioned are dibenzoyl peroxide, benzoyl hydroperoxide, t-butyl hydroperoxide, t-butyl peroxide, diisopropyl peroxide, diisopropylbenzene hydroperoxide, cumene hydroperoxide, 2,2'-azo-bis-isobutyronitrile, 2,2'-azo-bis(2,4-dimethylvaleronitrile), 2-t-butylazo-2-cyano-4-methylpentane and 4,4'-azo-bis(4-cyano-n-pentanol).

The preferred initiators are the azo compounds and in particular 2,2'-azo-bis-isobutyronitrile. The amount of initiator used is of the order of about 1% to 5% by weight relative to the weight of the unsaturated monomers.

The mixture obtained after copolymerization, which consists of a solution of a precursor copolymer containing the unsaturation and groups which can be alkoxylated in the prepolyol of low molecular weight, is then subjected to an alkoxylation treatment by means of ethylene oxide and/or propylene oxide, with the formation of polyol and of the "single comb-shaped" graft prestabilizing copolymer. The monomers which have two unsaturations or possess a high transfer constant take part, on the one hand, in the copolymerization in the prepolyol of low molecular weight and, on the other hand, during the dispersion, in grafting of the polymer on the "single comb-shaped" graft prestabilizing copolymer, with the formation of the "double comb-shaped" graft copolymer.

In the course of this alkoxylation, the groups which can be alkoxylated in the precursor copolymer and also the hydroxyl groups of the polyol of low molecular weight are converted to polyoxyethylenated and/or polyoxypropylenated groups. The ethylene oxide or propylene oxide can be used on its own to carry out the alkoxylation. However, it is preferable to use mixtures of ethylene oxide and propylene oxide so as to obtain condensation products having the desired characteristics with regard, in particular, to their reactivity towards isocyanates. In fact, it is known that the alkoxylation of compounds containing active hydrogen atoms by means of ethylene oxide gives condensation products which contain terminal primary hydroxyl groups, which are highly reactive towards isocyanates, while the alkoxylation by means of propylene oxide gives condensation products containing secondary hydroxyl groups, which are less reactive than the primary hydroxyl groups. In the production of polyurethanes it is sought to use polyethers having well defined proportions of primary hydroxyl groups relative to secondary hydroxyl groups, these proportions having an influence on the properties of the products obtained.

Within the framework of the present invention, the step comprising the alkoxylation of the graft copolymer in solution in the polyol of low molecular weight is preferably carried out by means of a mixture of ethylene oxide and propylene oxide containing about 40% to 95% of propylene oxide and about 60% to 5% of ethylene oxide.

The total amount of alkoxylating agent (ethylene oxide and/or propylene oxide) to be used is essentially a function of the molecular weight of the polyol which it is desired to form from that in which the graft copolymer is present in solution.

Relative to the total weight of the mixture subjected to alkoxylation, the amount of alkoxylating agent used is between about 20% and 85% by weight and preferably between 50% and 75% by weight, so as to form a polyol having a molecular weight of the order of about 3,000 to about 7,000 from the prepolyol of low molecular weight. The alkoxylation treatment is carried out in the conventional manner at a temperature of about 50° C. to 200° C. and in the presence of a catalyst, preferably a basic catalyst, such as an alkali metal hydroxide or an alkali metal alcoholate, for example potassium hydroxide, sodium hydroxide, potassium methylate or sodium methylate. The amount of catalyst to be used is about 0.1% to about 10% by weight relative to the weight of the mixture subjected to alkoxylation. After alkoxylation in the presence of a basic catalyst, the reaction mixture (product) is neutralized, for example by means of any acid which converts the catalyst to a neutral salt, such as acetic acid, carbon dioxide, phosphoric acid or sulphuric acid.

The "single comb-shaped" graft copolymers thus obtained, which are in solution in a polyol, can be used as prestabilizers in the preparation of stable dispersions of polymers/polyols intended for the production of polyurethane. The "double comb-shaped" stabilizing copolymer results from grafting of polymer on the graft copolymer.

The present invention also relates to the stable dispersions of polymers/polyols, their preparation by in situ polymerization of one or more unsaturated monomers in a polyol, in the presence of these "single comb-shaped" graft prestabilizing copolymers, and their use in the production of polyurethane foams.

The amounts of "single comb-shaped" graft prestabilizing copolymers used are about 1% to about 45% by weight, and preferably 5% to 30% by weight, relative to the total weight of the unsaturated monomer or monomers and the polyol.

The prestabilizing graft copolymer is preferably incorporated in the polyol to which the unsaturated monomer or monomers and the catalyst are then added. The in situ polymerization in the polyol is carried out at a temperature of between 25° C. and 170° C., and preferably between 80° C. and 120° C.

Polyols which can be used for the in situ polymerization are conventional polyols, such as saturated or unsaturated polyether-polyols or polyester-polyols, or mixtures of polyols.

Polyether-polyols prepared by a condensation reaction of ethylene oxide and/or propylene oxide with polyols, such as glycerol, trimethylolpropane, pentaerythritol, sorbitol, sucrose or propylene glycol are preferred.

Unsaturated monomers which can be used for the preparation of the polymers/polyols according to the invention are well known ethylenically unsaturated monomers, such as isoprene, butadiene, 1,4-pentadiene, styrene, methylstyrene, α-methylstyrene, p-tert-butylstyrene, acrylonitrile, acrylic acid, 2-hydroxyethyl acrylate, 2-hydroxyethyl methacrylate, benzyl acrylate, benzyl methacrylate, isopropyl acrylate, isopropyl methacrylate, methacrylonitrile, ethyl α-ethoxyacrylate, butyl acrylate, butyl methacrylate, 2-ethylhexyl acrylate, 2-ethylhexyl methacrylate, phenyl acrylate, phenyl methacrylate, N,N-dimethylacrylamide, N,N-dibenzylacrylamide, N-butylacrylamide, vinyl acetate, vinyl alcohol, vinyl butylate, vinyl acrylate, vinyl methacrylate, methyl vinyl ketone, dimethyl fumarate, dimethyl maleate, maleic acid, fumaric acid, dimethylaminoethyl acrylate, dimethylaminoethyl methacrylate, glycidyl acrylate, glycidyl methacrylate, allyl alcohol, vinylpyridine and vinylpyrrolidone, and vinyl halides, such as vinyl chloride, vinyl bromide and vinylidene chloride.

The preferred unsaturated monomers are acrylonitrile and styrene or mixtures of acrylonitrile and styrene. The amount of unsaturated monomer used is usually about 5% to 60% and preferably 15% to 50% by weight relative to the total weight of the mixture.

The in situ polymerization in the polyol is initiated by well known free radical initiators, such as peroxides, persulphates, perborates, percarbonates or azo compounds. In general, it is preferred to use azo catalysts, in particular 2,2'-azo-bis-isobutyronitrile, in combination with benzoyl peroxides at concentrations of about 0.1% to 5% by weight relative to the total weight of the reaction mixture. If desired, a chain transfer agent can be incorporated in the reaction mixture for the purpose of moderating the reaction and reducing the viscosity of the compositions obtained. To this end alcohols or mercaptans, such as, for example, 1-dodecanethiol or 2-mercaptoethanol, can be used.

The "double comb-shaped" graft stabilizing copolymers of the present invention enable dispersions of polymers/polyols to be prepared which have a greatly improved stability, in particular owing to the use of the monomer with two unsaturations. A significant deposit of solid particles of polymers is not produced at the end of prolonged periods of storage, even after several months.

These dispersions can be used without problems in conventional formulations of polyurethanes in order, in particular, to produce flexible foams having good lift properties by reaction with water, catalysts, surfactants and a polyisocyanate.

When mixtures of acrylonitrile and styrene are used as unsaturated monomers in the preparation of the polymers/polyols, the present invention also enables the proportion of acrylonitrile relative to styrene to be reduced without adversely affecting the stability of the dispersions. The drawback of the yellowing of polyurethane foams as a result of the use of high proportions of acrylonitrile is thus overcome.

Examples 1 to 10 which follow describe the preparation of "single comb-shaped" graft copolymers according to the invention. Examples 10 to 43 illustrate their use in the preparation of dispersions of polymers in the polyols. These examples are not limiting.

In the examples, the polyols designated by the letters A to F have the following composition:

Prepolyol A: Condensation product of propylene oxide and ethylene oxide with glycerol, with a molecular weight of 1,000. This copolymer contains 30% by weight of ethylene oxide in random distribution.

Prepolyol B: Identical to prepolyol A but containing 14.7 mg of KOH/g of polyol.

Prepolyol C: Condensation product of propylene oxide and ethylene oxide with glycerol, with a molecular weight of 1,000 and a base number of 12.2. The condensation product is made up of a polyoxypropylene segment followed by a random fragment containing 60% and 40% by weight of propylene oxide and ethylene oxide.

Polyol D: Condensation product with glycerol, with a molecular weight of 3,500, containing a random mixture of 87.5% of propylene oxide and 12.5% of ethylene oxide.

Polyol E: Condensation product with glycerol, with a molecular weight of 4,800, containing 13.5% by weight of ethylene oxide, of which 10% are terminal.

Prepolyol F: Condensation product of ethylene oxide and propylene oxide with glycerol, with a molecular weight of 1,000 and a base number of 15 mg of KOH/g. The condensation product is formed from a polyoxypropylene fragment followed by a random fragment of 89%–11% by weight of propylene oxide and ethylene oxide.

The "single comb-shaped" graft prestabilizing copolymers described above are prepared in a thermostat-controlled reactor which is fitted with a stirrer, a thermometer and a device for the injection of monomers.

EXAMPLE 1: "SINGLE COMB-SHAPED" GRAFT COPOLYMER I

A mixture of 1,000 g of styrene, 59 g of hydroxyethyl methacrylate (HEMA), 52 g of isoprene and 47 g of 2,2'-azo-bis-isobutyronitrile (AIBN) is injected in the course of two hours, at 120° C., into 1,500 g of prepolyol A. 630 g of the product thus obtained are added to a mixture of 865 g of prepolyol B and 400 g of toluene. A mixture of 2,660 g of propylene oxide and 356 g of ethylene oxide is then added. After removing the residual monomers under vacuum and neutralizing, a polyol is obtained which has a molecular weight of 3,500 and contains 5% of styrene-co-HEMA-co-isoprene copolymer, grafted with polyether chains with a molecular weight of about 800. It contains about 5 polyether chains per copolymer chain. The viscosity at 20° C. is 1,300 mPa.s.

EXAMPLE 2: "SINGLE COMB-SHAPED" GRAFT COPOLYMER II

A mixture of 1,115.9 g of styrene, 69.7 g of HEMA, 58.4 g of isoprene, 223 g of propylene oxide and 79 g of AIBN is added in the course of 2 hours, at 120° C., to 831 g of prepolyol B and 156 g of prepolyol A. After a reaction time of one hour, the residual monomers are removed under vacuum and the mixture of 2,214 g of propylene oxide and 332 g of ethylene oxide is then injected. After neutralization, a polyol with a molecular weight of 3,500 containing 19.7% of styrene-co-HEMA-co-isoprene copolymer is obtained.

The viscosity of the stabilizer II, at 25° C., is raised to 9,600 mPa.s. This copolymer has an average molecular weight, measured by osmometry, of 10,200 and it is grafted with, on average, 5.9 polyether chains with an average molecular weight of 830.

EXAMPLES 3 TO 6, 6a, AND 9: "SINGLE COMB-SHAPED" GRAFT COPOLYMERS III TO VI, IX AND XI

The "single comb-shaped" graft prestabilizing copolymers III to VI, IX and XI are prepared in a manner identical to that described in Example 2. The variables are given in Table I below. The molecular weights of the polyols, calculated from the hydroxyl number, the proportion of graft copolymer and the viscosity of the stabilizer at 20° C. are also given in Table I.

TABLE I

| Example No. | 3 | 4 | 5 | 6 | 9 | 6a |
|---|---|---|---|---|---|---|
| stabilizer | III | IV | V | VI | IX | XI |
| Polyol A (g) | 156 | — | — | — | 157.5 | — |
| Polyol B (g) | 831 | — | — | — | 811.7 | — |
| Polyol C (g) | — | 955.4 | 982 | 1322.7 | — | 1251.7 |
| Styrene (g) | 1115.9 | 1115.9 | 1115.9 | 338.6 | 557.9 | 609.5 |
| HEMA (g) | 69.7 | 69.7 | 69.7 | — | 69.7 | — |
| GMA (g) (2) | — | — | — | 23.1 | — | 20.7 |
| Isoprene (g) | 29.2 | 29.2 | — | 8.8 | 14.6 | 15.9 |
| AIBN (g) | 79.2 | 79.2 | 79.2 | 24.0 | 39.6 | 43.2 |
| Propylene oxide (g) | 223 | 223 | 223 | 39.5 | 223 | 71.1 |
| (PO + EO) (g) (1) | 2481 | 2545 | 2570 | 3270 | 2545 | 2940 |
| Molecular weight of the polyol | 3500 | 3500 | 3500 | 3500 | 3500 | 3500 |
| SMI (%) (3) | 22.2 | 22.2 | 20.4 | 7 | 12.7 | 8.5 |
| Viscosity at 25° C. (mPa · s) | 21400 | 16000 | 14200 | 1000 | 4650 | 1410 |
| Mn (osmometry) (4) | 12700 | 11600 | 12600 | (5) | 1200 | (5) |
| Average number of grafts per | 6.6 | 5.9 | 7.1 | (5) | 12 | (5) |

TABLE I-continued

| Example No. | 3 | 4 | 5 | 6 | 9 | 6a |
|---|---|---|---|---|---|---|
| stabilizer | III | IV | V | VI | IX | XI |
| chain Molecular weight of the grafts (Mn) | 830 | 830 | 830 | 3500 | 830 | 3500 |

(1) Mixture of 87% by weight of propylene oxide and 13% by weight of ethylene oxide
(2) GMA = glycidyl methacrylate
(3) SMI = styrene-hydroxyethyl methacrylate or glycidyl methacrylate-isoprene copolymer
(4) Mn = number-average molecular weight of the random copolymer styrene - hydroxyethyl methacrylate-isoprene
(5) Value not determined.

(4) Mn =number-average molecular weight of the random copolymer styrene - hydroxyethyl methacrylateisoprene (5) Value not determined.

EXAMPLE 7: COPOLYMER VII

A mixture of 700 g of styrene, 100 g of isoprene, 74 g of HEMA and 60 g of AIBN is added in the course of 2 hours, at 120° C., to 1,200 g of prepolyol A. The styrene-co-HEMA-co-isoprene copolymer is isolated from the prepolyol by precipitation in a methanol/water mixture (3/1). The copolymer has a structure comparable to that of the stabilizing graft copolymers but lacks polyether chains.

EXAMPLE 8: "SINGLE COMB-SHAPED" GRAFT COPOLYMER III

A mixture of 846 g of styrene, 52.9 g of HEMA, 22.2 g of isoprene, 60 g of AIBN and 169.2 g of propylene oxide is added in the course of 2 hours, at 120° C., to a reactor containing 766 g of prepolyol F. After a polymerization time of 1 hour, the residual monomers are removed under vacuum. 2,297 g of propylene oxide, a mixture of 314 g of propylene oxide and 121 g of ethylene oxide and finally 408 g of ethylene oxide are then added successively at 120° C. After neutralization a polyol is obtained which has a molecular weight of 4,800, contains 14.2% of styrene-co-HEMA-co-isoprene copolymer and has a viscosity at 25° C. of 9,000 mPa.s.

The "single comb-shaped" copolymer contains on average 7.9 polyether grafts per chain of average molecular weight 1,300. The average molecular weight of the copolymer measured by osmometry is 13,500.

EXAMPLE 10: "SINGLE COMB-SHAPED" GRAFT COPOLYMER X

A mixture of 108 g of methyl methacrylate, 7 g of HEMA, 2.94 g of isoprene, 8 g of AIBN and 23.6 g of propylene oxide is added to 810 g of prepolyol C and 2,000 ml of toluene After a polymerization time of 15 minutes at 120° C., 1,821 g of propylene oxide and 251 g of ethylene oxide are added. After the condensation reaction, the residual monomers and the solvent are distilled under vacuum.

After neutralization a methyl methacrylate-co-HEMA-co-isoprene copolymer in solution in a polyol with a molecular weight of 3,500 is then obtained. The copolymer is theoretically grafted with 6 polyether chains with a molecular weight of 830.

The viscosity of the product is 960 mPa.s at 25° C.

PREPARATION OF DISPERSIONS

DISPERSIONS BASED ON PRESTABILIZING GRAFT COPOLYMER I

The polymer dispersions are prepared in a thermostat-controlled reactor which is equipped with a stirrer, a thermometer and a device for the injection of monomers. After adding the monomers and the initiator in the course of one hour, the polymerization is continued for a further one hour and the residual monomers are then removed under vacuum.

EXAMPLES 11 TO 16

Table II

The prestabilizing graft copolymer I is capable of stabilizing dispersions of 20% of SAN (styrene-acrylonitrile) containing 20% of acrylonitrile. These dispersions are described in Table II. In the presence of the stabilizing graft copolymer, the polymer dispersions are stable and white in color and are characterized in terms of the viscosity at 20° C. and the stability. The viscosity is measured with an apparatus fitted with a measuring system of the "Couette" type (MLW: Rheotest 2.1.). The stability is assessed on the basis of a centrifuging test at 10,000 revolutions per minute for 30 minutes (JANETSKI T 24) (1,700 g).

The use of a higher proportion of stabilizing graft copolymer I allows a dispersion containing 30% of SAN, the latter subsequently being diluted by the polyol II in order to reduce the concentration of dispersed SAN to 20% (Example 16).

EXAMPLES 17 TO 22

Table III

These examples show the influence of a monomer containing two unsaturations in the graft polymer on the stability of the 20% (Examples 17 to 19) or 30% (Examples 20 to 22) dispersion of SAN.

The use of the graft copolymers II and III provided with isoprene units gives more stable dispersions with a more homogeneous particle size than those prepared from the graft copolymer V.

TABLE II

| | | | Examples 11 to 16 | | | | | | |
|---|---|---|---|---|---|---|---|---|---|
| | | Prestabilizing | Monomers | | | Initiators (%) (a) | | Viscosity | Centrifuging |
| No. | Polyol D % | graft copolymer (%) | Total | Styrene | AN | AIBN | Benzoyl peroxide | @ 20° C. (mPa · s) | test (%) (b) |
| Ex. 11 | 80 | 0 | 20 | 16 | 4 | 5.26 | — | (c) | (d) |
| Ex. 12 | 40 | 40 | 20 | 16 | 4 | 5.26 | — | 1950 | 0 |
| Ex. 13 | 80 | 0 | 20 | 16 | 4 | — | 1.16 | (c) | (d) |

TABLE II-continued

Examples 11 to 16

| No. | Polyol D % | Prestabilizing graft copolymer (%) | Monomers (%) Total | Monomers (%) Styrene | Monomers (%) AN | Initiators (%) (a) AIBN | Initiators (%) (a) Benzoyl peroxide | Viscosity @ 20° C. (mPa · s) | Centrifuging test (%) (b) |
|---|---|---|---|---|---|---|---|---|---|
| Ex. 14 | 60 | 20 | 20 | 16 | 4 | — | 1.16 | 7350 | 15.8 |
| Ex. 15 | 60 | 20 | 20 | 16 | 4 | 0.40 | 0.58 | 1780 | 5.8 |
| Ex. 16 | 35 | 35 | 30 | 24 | 6 | — | 1.16 | 3260 | 8.3 |

(a) Percentage in % of initiator relative to monomers.
(b) Percent by weight of the polymer/polyol dispersion sedimented by centrifuging.
(c) Precipitation almost complete.
(d) Not determined.

TABLE III

Examples 17 to 22

| No. | Polyol D (%) | Prestabilizing graft copolymer (%) | Isoprene in the prestabilizing graft copolymer (%) | Monomers (%) Total | Monomers (%) Styrene | Monomers (%) AN | Initiators (%) AIBN | Initiators (%) Benzoyl peroxide | Conversion (%) | Viscosity @ 20° (mPa · s) | Viscosity 20° C. after dilution to 20% SAN (mPa · s) | Centrifuging test (%) (a) |
|---|---|---|---|---|---|---|---|---|---|---|---|---|
| Ex. 17 | 75 | 5 | 1.17 | 20 | 16 | 4 | 0.40 | 0.58 | 87 | 4654 | (b) | (b) |
| Ex. 18 | 75.5 | 4.5 | 0.58 | 20 | 16 | 4 | 0.40 | 0.58 | 81 | 1931 | (b) | (b) |
| Ex. 19 | 75 | 5 | — | 20 | 16 | 4 | 0.40 | 0.58 | 86 | 4650 | (b) | (b) |
| Ex. 20 | 61.2 | 8.8 | 1.17 | 30 | 24 | 6 | 0.40 | 0.58 | 87 | 4062 | 2210 | 5.9 |
| Ex. 21 | 62.1 | 7.9 | 0.58 | 30 | 24 | 6 | 0.40 | 0.58 | 83 | 4000 | 2230 | 7.4 |
| Ex. 22 | 61.2 | 8.8 | — | 30 | 24 | 6 | 0.40 | 0.58 | 91 | 10480 | 3140 | 16.1 |

(a) Percentage by weight of the polymer/polyol (30%) dispersion sedimented by centrifuging.
(b) Not determined.

EXAMPLES 23 TO 25

TABLE IV

These examples allow the comparison of 20% to 40% dispersions of SAN stabilized by an amount of prestabilizing graft copolymer proportional to the percentage of SAN dispersed.

A significant increase in the viscosity as a function of the increase in the percentage of SAN dispersed and a contrary effect after dilution to 20% of SAN is found.

EXAMPLES 26 TO 29

TABLE V

These examples demonstrate the effect of the percentage of prestabilizing graft copolymer on the properties of the dispersions.

40% dispersions of SAN stabilized by 3.8%, 7.6%, 11.4% and 15.2% of prestabilizing graft copolymer II were prepared. The first dispersion (Ex. 26) is unstable and highly viscous. When the percentage of copolymer is doubled (Ex. 27), the dispersion becomes stable and its viscosity is much lower. If the proportion of graft copolymer is further increased (Ex. 28 and 29) the viscosity increases again. The centrifuging tests show the significant decline in the amount of precipitate as a function of the increase in the percentage of prestabilizing graft copolymer II.

EXAMPLES 21 AND 30 TO 35

TABLE VI

These examples permit the use of the graft copolymers to be extended to the stabilization of other polymers.

By virtue of the graft copolymers it is possible to prepare stable dispersions from polystyrene (Ex. 30) equally as well as from SAN on the basis of 20%, 30%, 50% and 70% of acrylonitrile (Ex. 21 and 31 to 35).

The examples described show the wide field of application of the graft copolymers which are the subject of the invention as stabilizers for dispersions of various polymers in the polyol.

TABLE IV

Examples 23 to 25

| No. | Polyol D (%) | Prestabilizing graft copolymer IV (%) | Monomers (%) Total | Monomers (%) Styrene | Monomers (%) Acrylonitrile | Initiators (%) AIBN | Initiators (%) Benzoyl peroxide | Conversion (%) | Viscosity @ 20° C. (mPa · s) | Viscosity @ 20° C. after dilution to 20% SAN (mPa · s) | Centrifuging test (a) (%) |
|---|---|---|---|---|---|---|---|---|---|---|---|
| Ex. 23 | 74.6 | 5.4 | 20 | 16 | 4 | 0.40 | 0.58 | 84 | 4350 | — | (b) |
| Ex. 24 | 61.9 | 8.1 | 30 | 24 | 6 | 0.40 | 0.58 | 88 | 8385 | 3040 | 9.9 |
| Ex. 25 | 49.2 | 10.8 | 40 | 32 | 8 | 0.40 | 0.58 | 91 | 31270 | 2900 | (b) |

(a) Percentage by weight of the polymer/polyol (20%) dispersion sedimented by centrifuging.
(b) Not determined.

TABLE V

Examples 26 to 29

| No. | Polyol D (%) | Prestabilizing graft copolymer IV (%) | Monomers (%) Total | Styrene | Acrylonitrile | Initiators (%) AIBN | Benzoyl peroxide | Conversion (%) | Viscosity @ 20° C. (mPa·s) | Viscosity @ 20° C. after dilution to 20% SAN (mPa·s) | Centrifuging test (a) (%) |
|---|---|---|---|---|---|---|---|---|---|---|---|
| Ex. 26 | 56.2 | 3.8 | 40 | 32 | 8 | 0.40 | 0.58 | 89 | 43160 | 3520 | 36 |
| Ex. 27 | 52.4 | 7.6 | 40 | 32 | 8 | 0.40 | 0.58 | 90 | 7860 | 1720 | 7 |
| Ex. 28 | 48.6 | 11.4 | 40 | 32 | 8 | 0.40 | 0.58 | 92 | 13650 | 1800 | 4.6 |
| Ex. 29 | 15.2 | 15.2 | 40 | 32 | 8 | 0.40 | 0.58 | 89 | 16770 | 4700 | 0.6 |

(a) Percentage by weight of the polymer/polyol (20%) dispersion sedimented by centrifuging.
(b) Not determined.

TABLE VI

Examples 21 and 30 to 35

| No. | Polyol D (%) | Prestabilizing graft copolymer ref. | Polyol containing the prestabilizing graft copolymer (%) | Monomers (%) Total | Styrene | AN | MMA (b) | Initiators (%) AIBN | Benzoyl peroxide | Conversion (%) | Viscosity at 20° C. mPa·s | Viscosity at 20° C. after dilution to 20% with the polyol (%) | Centrifuging test (a) (%) |
|---|---|---|---|---|---|---|---|---|---|---|---|---|---|
| Ex. 30 | 61.2 | II | 8.8 | 30 | 30 | — | — | — | 0.58 | 75 | 3815 | 2520 | 0 |
| Ex. 21 | 62.1 | III | 7.9 | 30 | 24 | 6 | — | 0.40 | 0.58 | 83 | 4062 | 2210 | 7.4 |
| Ex. 31 | 62.1 | III | 7.9 | 30 | 21 | 9 | — | 0.40 | 0.58 | 92 | 6970 | 2810 | 0 |
| Ex. 32 | 62.1 | III | 7.9 | 30 | 15 | 15 | — | 0.40 | 0.58 | 91 | 6280 | 2590 | 6.1 |
| Ex. 33 | 62.4 | III | 7.9 | 30 | 9 | 21 | — | 0.40 | 0.58 | 94 | 4090 | 2515 | 9.5 |
| Ex. 34 | 62.1 | III | 7.9 | 30 | — | 30 | — | 0.40 | 0.58 | 90 | 10200 | 4792 | 63 |
| Ex. 35 | 75.5 | III | 4.5 | 20 | 13.6 | 3.4 | 3 | 0.40 | 0.58 | 86 | 2505 | — | 18 |

(a) Percentage by weight of the polymer/polyol (40%) dispersion sedimented by centrifuging.
(b) Methyl methacrylate.

EXAMPLES 21 AND 36 TO 38

TABLE VII

These examples describe the synthesis of SAN dispersions with a view to the preparation of foams of high lift (polyol III) and high resilience (polyol V). During the preparation of dispersions for foams of high resilience, the percentage of SAN is reduced to 14% by dilution with the polyol V.

It is found that the stabilizing graft copolymer for foams of high resilience (prestabilizing graft copolymer VIII) also stabilizes the dispersions for foams of high lift, and vice versa.

EXAMPLE 39

TABLE VII

This example shows the necessity for grafting polyether chains on the styrene-hydroxyethyl methacrylate-isoprene copolymer. The copolymer VI, which lacks polyether grafts, is dissolved in the polyol IV by means of tetrahydrofuran. The 20% dispersion of SAN is prepared in the presence of copolymer VI in the polyol IV from which the solvent has been removed. SAN already precipitates after the injection of about one third of the mixture of monomers.

EXAMPLES 21 AND 40 TO 42

TABLE VIII

These examples show the role of the number and the size of the polyether chains on the main characteristics of the dispersions.

When the 30% dispersion of SAN is stabilized by a copolymer theoretically grafted with 12 polyether chains on average, ($\overline{Mn}$ 830) (Ex. 40), it is more stable than that based on a copolymer provided with two times less the polyether chains (Ex. 21) (centrifuging test).

The copolymers grafted with polyether chains of $\overline{Mn}$ 3,500 give rise to dispersions which are more viscous and also less well stabilized, as the centrifuging tests show.

EXAMPLES 21 AND 43

TABLE VIII

These examples illustrate the use of prestabilizing graft copolymers of different structure. The graft copolymer is based on styrene (Ex. 21: prestabilizing graft copolymer III) or methyl methacrylate (Ex. 43; prestabilizing graft copolymer X). A stable 30% dispersion of SAN can be prepared with each of these.

TABLE VII

Examples 21, 36 to 38 and 39

| No. | Polyol Ref. | (%) | Prestabilizing graft copolymer Ref. | (%) | Monomers (%) Total | Styrene | AN | Initiators (%) AIBN | Benzoyl peroxide | Conversion (%) | Viscosity at 20° C. (mPa·s) | SAN concentration after dilution (%) | Viscosity at 20° C. after dilution (mPa·s) |
|---|---|---|---|---|---|---|---|---|---|---|---|---|---|
| Ex. 21 | D | 62.1 | III | 7.9 | 30 | 24 | 6 | 0.4 | 0.58 | 83 | 4000 | 20 | 2230 |
| Ex. 36 | D | 57.7 | VIII | 12.3 | 30 | 24 | 6 | 0.4 | 0.58 | 89 | 5660 | 20 | 2510 |
| Ex. 37 | E | 62.1 | III | 7.9 | 30 | 24 | 6 | 0.4 | 0.58 | 91 | 9015 | 14 | 2400 |
| Ex. 38 | E | 57.7 | VIII | 12.3 | 30 | 24 | 6 | 0.4 | 0.58 | 89 | 10430 | 14 | 2600 |

TABLE VII-continued

Examples 21, 36 to 38 and 39

| No. | Polyol Ref. | (%) | Prestabilizing graft copolymer Ref. | (%) | Monomers (%) Total | Styrene | AN | Initiators (%) AIBN | Benzoyl peroxide | Conversion (%) | Viscosity at 20° C. (mPa·s) | SAN concentration after dilution (%) | Viscosity at 20° C. after dilution (mPa·s) |
|---|---|---|---|---|---|---|---|---|---|---|---|---|---|
| Ex. 39 | D | 79 | VII | 10 (a) | 20 | 16 | 4 | — | 1.16 | — | — | — | — |

(a) 10% solution of copolymer VII in polyol D.

TABLE VIII

Examples 21 and 40 to 42

| No. | Polyol D (%) | Prestabilizing graft copolymer Ref. | (%) | $\overline{Mn}$ of the polyether grafts | Average number of polyether grafts | Monomers (%) Total | Styrene | AN | Initiators (%) AIBN | Benzoyl peroxide | Conversion (%) | Viscosity @ 20° C. (mPa·s) | Viscosity to 20% SAN @ 20° C. (mPa·s) | Centrifuging test (%) |
|---|---|---|---|---|---|---|---|---|---|---|---|---|---|---|
| Ex. 21 | 62.1 | III | 7.9 | 830 | 6.6 | 30 | 24 | 6 | 0.40 | 0.58 | 83 | 4000 | 2230 | 7.4 |
| Ex. 40 | 56.2 | IX | 13.8 | 830 | 12 | 30 | 24 | 6 | 0.40 | 0.58 | 88 | 4700 | 2725 | 0 |
| Ex. 41 | 44.9 | VI | 25.1 | 3500 | (6) (a) | 30 | 24 | 6 | 0.40 | 0.58 | 88 | 18440 | 4240 | 39 |
| Ex. 42 | 49.4 | XI | 20.6 | 3500 | (3) (a) | 30 | 24 | 6 | 0.40 | 0.58 | 88 | 15300 | (b) | 73 |
| Ex. 43 | 51.5 | X | 18.5 | 830 | (6) (a) | 30 | 24 | 6 | 0.40 | 0.58 | 92 | 4530 | 2400 | 10.2 |

(a) Theoretical value
(b) Not diluted to 20% SAN because it has too many lumps.

Evaluation of the dispersions

The dispersions of polymers/polyols are mixed with stirring, in the indicated proportions, with water, the catalysts and the silicones, and the isocyanate is then added; after vigorous stirring, the mixture is cast into a mold of tarred paper.

Table IX (Examples 44 to 50) summarizes the recipes used as well as the physical properties of the foams obtained from the dispersions described in the preceding examples.

TABLE IX

Formulations and properties of polyurethane foams obtained from dispersions according to the invention

| | Examples | | | | | | |
|---|---|---|---|---|---|---|---|
| | 44 | 45 | 46 | 47 | 48 | 49 | 50 |
| Polyol D | 100 | | | | | | |
| Dispersion Ex. 20 | | 100 | | | | | |
| Dispersion Ex. 19 | | | 100 | | | | |
| Dispersion Ex. 14 | | | | 100 | | | |
| Dispersion Ex. 15 | | | | | 100 | | |
| Dispersion Ex. 21 | | | | | | 100 | |
| Dispersion Ex. 43 | | | | | | | 100 |
| Water | 3 | 3 | 3 | 3 | 3 | 3 | 3 |
| Silicomb BF 4700 | 1 | 1 | 1 | 1 | 1 | 1 | 1 |
| Dabco 33 LV (1) | 0.07 | 0.07 | 0.07 | 0.07 | 0.07 | 0.07 | 0.07 |
| Niax A 1 (2) | 0.07 | 0.07 | 0.07 | 0.07 | 0.07 | 0.07 | 0.07 |
| Tin octoate | 0.20 | 0.20 | 0.175 | 0.20 | 0.20 | 0.20 | 0.20 |
| TDI 80/65 (80/20) (i = 108) (3) | 39 | 37.8 | 38.2 | 37.8 | 36.9 | 37.9 | 38.4 |
| Physical properties | | | | | | | |
| Development time (sec) | 132 | 110 | 135 | 122 | 122 | 107 | 103 |
| Apparent density (kg/m$^3$) (4) | 31.3 | 33.7 | 33.5 | 33.3 | 36.7 | 31.5 | 33.0 |
| Breaking load (kPa) (5) | 91 | 142 | 137 | 146 | 130 | 110 | 175 |
| Elongation at break (%) (5) | 155 | 141 | 175 | 152 | 111 | 71 | 138 |
| Tear resistance (kN/m) (5) | 0.51 | 0.64 | 0.63 | 0.80 | 0.72 | 0.40 | 0.52 |
| Set compression: 90%-70° C.-22 h (%) (5) | 16.9 | 8.4 | 15.1 | 8.7 | 6.7 | 7.6 | 87 |
| Indentation - 5th | | | | | | | |
| cycle 25% (kPa) | 3.1 | 4.4 | 5.1 | 4.8 | 7.5 | 6.3 | 4.9 |
| (6)    40% (kPa) | 5.1 | 9.0 | 5.9 | 6.0 | 9.3 | 7.0 | 5.7 |
| 65% (kPa) | 6.9 | 12.5 | 11.5 | 14.2 | 20.9 | 14.5 | 12.2 |
| Lift index - 5th | 0.11 | 0.16 | 0.18 | 0.18 | 0.25 | 0.22 | 0.17 |

TABLE IX-continued

Formulations and properties of polyurethane foams obtained from dispersions according to the invention

| | Examples | | | | | | |
|---|---|---|---|---|---|---|---|
| | 44 | 45 | 46 | 47 | 48 | 49 | 50 |
| cycle (7) | | | | | | | |

(1) Amine catalyst; registered trade mark; Air Products.
(2) Amine catalyst; registered trade mark; Union Carbide.
(3) Toluene diisocyanate.
(4) DIN 53420.
(5) ASTM D 1564.
(6) DIN 53577.
(7) Indentation at 40%/apparent density.

It must be understood that the present invention is in no way limited to the above embodiments and that many modifications can be made thereto without departing from the scope of the present invention.

What is claimed is:

1. A graft prestabilizing copolymer, characterized in that it comprises the product of the in situ reaction of a mixture of ethylenically unsaturated monomers containing at least one mono-unsaturated monomer containing no groups which can be alkoxylated and one unsaturated monomer containing a group which can be alkoxylated, a prepolyol of low molecular weight and a polymerization catalyst as well as an alkoxylating agent for the above mentioned reaction product chosen from the group comprising ethylene oxide, propylene oxide and their mixtures.

2. Copolymer according to claim 1, characterized in that the mixture of monomers contains at least one monomer promoting free radical grafting.

3. Copolymer according to claim 1, characterized in that the proportion by weight of the mixture of monomers is of the order of 1% to 75% relative to the prepolyol.

4. Copolymer according to claim 3, characterized in that the proportion by weight of the mixture of monomers is of the order of 20% to 60% relative to the prepolyol.

5. Copolymer according to claim 1, characterized in that the prepolyol has a molecular weight of less than 5,000.

6. Copolymer according to claim 5, characterized in that the molecular weight of the prepolyol is between 500 and 2,000.

7. Copolymer according to claim 2, characterized in that the mixture of ethylenically unsaturated monomers contains about 1 to 20 moles of unsaturated monomer containing a group which can be alkoxylated and 1 to 25 moles of monomer promoting free radical grafting per 100 moles of mono-unsaturated monomer which does not contain groups which can be alkoxylated.

8. Copolymer according to claim 1, characterized in that the mono-unsaturated monomer which does not contain groups which can be alkoxylated is chosen from the groups comprising styrene, α-methylstyrene, methylstyrene, 2,4-dimethylstyrene, ethylstyrene, isopropylstyrene, butylstyrene, phenylstyrene, cyclohexylstyrene, benzylstyrene, chlorostyrene, 2,5-dichlorostyrene, bromostyrene, cyanostyrene, nitrostyrene, N,N,-dimethylaminostyrene, acetoxystyrene, methyl 4-vinylbenzoate, phenoxystyrene, acrylonitrile, methacrylonitrile, methyl acrylate, methyl methacrylate, cyclohexyl acrylate, cyclohexyl methacrylate, benzyl acrylate, benzyl methacrylate, isopropyl acrylate, isopropyl methacrylate, octyl acrylate, octyl methacrylate, methyl, α-chloroacrylate, ethyl α-ethoxyacrylate, butyl acrylate, butyl methacrylate, 2-ethylhexyl acrylate, 2-ethylhexyl methacrylate, phenyl acrylate, phenyl methacrylate, α-chloroacrylonitrile, N,N-dimethylacrylamide or N,N-dibenzylacrylamide, vinylidene chloride, vinyl bromide, vinyl chloride, vinyl fluoride, vinylidene fluoride, vinyl acetate, vinyl chloroacetate, isopropenyl acetate, vinyl formate, vinyl methoxyacetate, vinyl benzoate, methyl vinyl ether, ethyl vinyl ether, propyl vinyl ether, butyl vinyl ether, phenyl vinyl ether, methyl vinyl ketone, vinylpyridine, ethyl vinyl ketone, phenyl vinyl ketone, N-vinylpyrrolidone, dimethyl fumarate or dimethyl maleate.

9. Copolymer according to claim 1, characterized in that the unsaturated monomer containing a group which can be alkoxylated is chosen from the group comprising allyl alcohol, 2-butene-1,4-diol, 3-butene-1,2-diol, glycerol monoallyl ether, trimethylolpropane monoallyl ether, hydroxyethyl acrylate, hydroxyethyl methacrylate, hydroxypropyl acrylate, hydroxypropyl methacrylate, glycerol monoacrylate and glycerol monomethacrylate, monoethanolamine, diethanolamine, triethanolamine, acrylic acid, methacrylic acid, fumaric acid, itaconic acid, crotonic acid, maleic anhydride, acrylamide methacrylamide, N-butylacrylamide, glycidyl acrylate, glycidyl methacrylate, allylglycidyl ether, butadiene monoepoxide and vinylcyclohexane-3,4-epoxide.

10. Copolymer according to claim 2, characterized in that the monomer promoting free radical grafting is chosen from the group comprising butadiene, isoprene, 1,4-pentadiene, piperylene, 1,4-hexadiene, 1,7-octadiene, allyl acrylate, allyl methacrylate, ethylene glycol dimethacrylate, diethylene glycol dimethacrylate, 1,4-butanediol dimethacrylate, divinylbenzene, divinyl ether, divinyl sulphide, divinyl sulphone, N,N-diethylaminoethyl acrylate, vinyl laurate, vinyl isobutyrate, vinyl dodecanate, vinyl hexanoate, the bromstyrenes, the α- and β-bromostyrenes, vinylnaphthalene and vinylanthracene.

11. Copolymer according to claim 1, characterized in that the amount by weight of catalyst is of the order of 1% to 5% relative to the ethylenically unsaturated monomer.

12. Copolymer according to claim 11, characterized in that the catalyst is chosen from the group comprising dibenzoyl peroxide, benzoyl hydroperoxide, t-butyl hydroperoxide, t-butyl peroxide, diisopropyl peroxide, diisopropylbenzene hydroperoxide, cumene hydroperoxide, 2,2'-azo-bis-isobutyronitrile, 2,2'-azo-bis(2,4-dimethylvaleronitrile), 2-t-butylazo-2-cyano-4-methylpentane and 4,4'-azo-bis(4-cyano-n-pentanol).

13. Copolymer according to claim 12, characterized in that the catalyst is dibenzoyl peroxide or 2,2'-azo-bis-isobutyronitrile.

14. Copolymer according to claim 1, characterized in that the abovementioned alkoxylating agent is a mixture of ethylene oxide and propylene oxide.

15. Copolymer according to claim 14, characterized in that the mixture contains about 40% to 95% of propylene oxide and about 5% to 60% of ethylene oxide.

16. Copolymer according to claim 1, characterize din that the proportion by weight of akoxylating agent relative to the abovementioned reaction product is of the order of 20% to 85%.

17. Copolymer according to claim 16, characterized in that the proportion by weight of akoxylating agent is of the order of 50% to 75%.

18. Process for the preparation of a stabilizing graft copolymer according to claim 1, characterized in that it comprises the in situ copolymerization of the mixture of ethylenically unsaturated monomers in the prepolyol of low molecular weight in the presence of the polymerization catalyst in such a way as to form an unsaturated precursor copolymer, containing a group which can be akoxylated, in solution in the prepolyol, the alkoxylation of the said precursor copolymer and of the prepolyol in the presence of a basic catalyst in such a way as to obtain a reaction product constituted by a graft copolymer in solution in a polyol and the neutralization of the reaction product by an acid, enabling the basic catalyst to be converted to a neutral salt.

19. Process according to claim 18, characterized in that the polyol has a molecular weight of 3,000 to 7,000.

20. Process according to claim 18, characterized in that the alkoxylation is carried out at a temperature of the order of 50° C. to 200° C.

21. Process according to claim 18, characterized in that the amount of basic catalyst to be used is about 0.1% to about 10% weight relative to the weight of the precursor copolymer/prepolyol mixture subjected to the alkoxylation.

22. Process according to claim 18, characterized in that the basic catalyst used is a compound chosen from the group comprising potassium hydroxide, sodium hydroxide, potassium methylate and sodium methylate.

23. A stable dispersion of polymer/polyol, characterized in that it comprises the product of the in situ reaction of at least one ethylenically unsaturated monomer in the polyol, a graft prestabilizing copolymer according to claim 1, and a polymerization initiator.

24. Dispersion according to claim 23, characterized in that the proportion by weight of graft prestabilizing copolymer is about 1% to about 45% by weight relative to the total weight of unsaturated commoner and of polyol.

25. Dispersion according to claim 24, characterized in that the proportion by weight of graft prestabilizing copolymer is about 5% to 30%.

26. Dispersion according to claim 23, characterized in that the polyol is a polyetherpolyol prepared by a condensation reaction of propylene oxide and/or ethylene oxide with a polyol, such as glycerol, trimethylolpropane, pentaerythritol, sorbitol, sucrose or propylene glycol.

27. Dispersion according to claim 23, characterized in that the proportion by weight of ethylenically unsaturated monomer is of the order of 5% to 60% relative to the total weight of graft copolymer, polyol and initiator.

28. Dispersion according to claim 27, characterized in that the proportion by weight of ethylenically unsaturated monomer is of the order of 15% to 50%.

29. Dispersion according to claim 23, characterized in that the ethylenically unsaturated monomer is a substance chosen from the group comprising isoprene, butadiene, 1,4-pentadiene, styrene, methylstyrene, α-methylstyrene, p-tert-butylstyrene, acrylonitrile, acrylic acid, 2-hydroxyethyl acrylate, 2-hydroxyethyl methacrylate, benzyl acrylate, benzyl methacrylate, isopropyl acrylate, isopropyl methacrylate, methacrylonitrile, ethyl α-ethoxyacrylate, butyl acrylate, butyl methacrylate, 2-ethylhexyl acrylate, 2ethylhexyl methacrylate, phenyl acrylate, phenyl methacrylate, N,N-dimethylacrylamide, N,N-dibenzylacrylamide, N-butylacrylamide, vinyl acetate, vinyl alcohol, vinyl butylate, vinyl acrylate, vinyl methacrylate, methyl vinyl ketone, dimethyl fumarate, dimethyl maleate, maleic acid, fumaric acid, dimethylaminoethyl acrylate, dimethylaminoethyl methacrylate, glycidyl acrylate, glycidyl methacrylate, allyl alcohol, vinylpyridine, vinylpyrrolidone, vinyl chloride, vinyl bromide and vinylidene chloride.

30. Dispersion according to claim 29, characterized in that the ethylenically unsaturated monomer is chosen from the group comprising acrylonitrile, styrene and the mixtures of acrylonitrile and styrene.

31. Dispersion according to claim 23, characterized in that the proportion by weight of initiator is of the order of 0.1% to 5% relative to the total weight of ethylenically unsaturated monomer, graft copolymer and polyol.

32. Dispersion according to claim 23, characterized in that the initiator is chosen from the group comprising benzoyl peroxide, 2,2'-azo-bis-isobutyronitrile and the mixtures of these compounds.

33. Process for the preparation of a stable dispersion of polymer/polyol according to claim 23, characterized in that it comprises the in situ polymerization of at least one ethylenically unsaturated monomer in the polyol in the presence of the prestabilizing graft copolymer, in the presence of the polymerization initiator, the unsaturated monomer being polymerized, under the effect of the initiator, into particles which are insoluble and partially grafted on the prestabilizing copolymer in the polyol and producing a graft copolymer ensuring the stabilization of the dispersion thus obtained.

34. Process according to claim 33, characterized in that a supplementary quantity of polyol is added.

35. Process according to claim 33, characterized in that the polymerization is carried out at a temperature of the order of 25° C. 170° C.

36. Process according to claim 35, characterized in that the polymerization temperature is between 80° C. and 120° C.

37. Process according to claim 33, characterized in that a chain transfer agent is added during the above mentioned polymerization.

38. Process for the preparation of a polyurethane foam, characterized in that the stable dispersion of polymer/polyol according to claim 23, is reacted with water, catalysts, surfactants and a polyisocyanate.

39. Process according to claim 38, characterized in that water, catalysts and surfactants are mixed with the dispersion of polymer/polyol before the latter is brought into contact with the polyisocyanate.

40. Polyurethane foam such as obtained by the process according to claim 39.

* * * * *